United States Patent [19]
Cawley

[11] Patent Number: 5,568,596
[45] Date of Patent: Oct. 22, 1996

[54] IMAGE PROCESSING SYSTEM WITH IMPROVED COLOR COMPENSATION WHEN TRANSFERRING BETWEEN COLOR FORMATS

[75] Inventor: Robin A. Cawley, Newbury, England

[73] Assignee: Quantel Limited, Newbury, England

[21] Appl. No.: 201,804

[22] Filed: Feb. 25, 1994

[30] Foreign Application Priority Data

Feb. 25, 1994 [GB] United Kingdom ............... 9303834

[51] Int. Cl.$^6$ ........................................... H04N 1/40
[52] U.S. Cl. ................................................. 395/131
[58] Field of Search ........................ 395/131, 132; 358/501, 502, 515, 518, 525

[56] References Cited

U.S. PATENT DOCUMENTS

| | | | |
|---|---|---|---|
| 4,623,973 | 11/1986 | Hoffrichter et al. | 364/526 |
| 4,829,455 | 5/1989 | Long et al. | 364/521 |
| 4,829,584 | 5/1989 | Shimano | 382/41 |
| 4,864,388 | 9/1989 | Skrydstrup | 358/22 |
| 4,992,861 | 2/1991 | D'Errico | 358/75 |
| 5,012,333 | 4/1991 | Lee et al. | 358/80 |
| 5,018,085 | 5/1991 | Smith, Jr. | 364/526 |
| 5,155,588 | 10/1992 | Levien | 358/80 |
| 5,157,483 | 10/1992 | Shoji et al. | 358/515 |
| 5,227,863 | 7/1993 | Bilbrey et al. | 348/578 |
| 5,233,684 | 8/1993 | Ulichney | 395/131 |
| 5,321,797 | 6/1994 | Morton | 395/131 |

FOREIGN PATENT DOCUMENTS

| | | | |
|---|---|---|---|
| 0090596 | 10/1983 | European Pat. Off. | G03F 3/08 |
| 0196044 | 10/1986 | European Pat. Off. | H04N 1/40 |
| 0350870 | 1/1990 | European Pat. Off. | H04N 1/46 |
| 0377386 | 7/1990 | European Pat. Off. | H04N 1/40 |
| 0410719 | 1/1991 | European Pat. Off. | H04N 1/46 |
| 0441609 | 8/1991 | European Pat. Off. | H04N 1/46 |
| 0482790 | 4/1992 | European Pat. Off. | H04N 1/40 |
| 0497325 | 8/1992 | European Pat. Off. | H04N 1/46 |
| 0514746 | 11/1992 | European Pat. Off. | H04N 1/46 |
| 0514166 | 11/1992 | European Pat. Off. | H04N 1/46 |
| 0555866 | 8/1993 | European Pat. Off. | H04N 1/46 |
| 2053619 | 2/1981 | United Kingdom | H04N 1/46 |
| 2260669 | 4/1993 | United Kingdom | H04N 1/46 |
| 9205668 | 4/1992 | WIPO | H04N 9/11 |

OTHER PUBLICATIONS

Foley et al, "Computer Graphics: Principles and Practice, Second Edition," pp. 584–589, 1990.

Microsoft Windows 3.1 User's Guide, p. 146, copyright 1991.

Roesnberg J., "Computers, Information Processing & Telecommunications, Second Edition", pp. 572 & 614, copyright 1987.

Primary Examiner—Mark K. Zimmerman
Assistant Examiner—Cliff N. Vo
Attorney, Agent, or Firm—Cooper & Dunham LLP

[57] ABSTRACT

An image processing system (10, 20) comprises a framestore (11) or other source of image data in a first color format (RGB) and is arranged to convert the data into data representing at least one color separation. A color rotator 14, such as a color transform matrix, is provided for rotating on a pixel-by-pixel basis the first color format data (RGB) into data in a second color format (NPQ) selected such that one of the colors thereof corresponds to the color of the at least one color separation. A look-up table (15) determines from the most significant parts of the data from the rotator (14) a range of color values in the second color format which includes the value of the color separation pixel. An interpolator (16) receives data defining the range of values from the look-up table and in response to the least significant parts of the data from the color rotator (14) interpolates the data from the look-up table to determine the value of the color separation pixel.

27 Claims, 6 Drawing Sheets

IMAGE PROCESSING SYSTEM WITH IMPROVED COLOR COMPENSATION WHEN TRANSFERRING BETWEEN COLOR FORMATS

BACKGROUND AND SUMMARY

The invention relates to an image processing system and in particular, but not exclusively, to a processing system for producing output digital image color separation data in one color format from input digital image color separation data in another color format.

In electronic image processing systems, images are normally defined by data representing an array of picture elements with each picture element being defined in terms of its red, green and blue content. Any three color components could in fact be used to represent a picture element but red, green and blue are chosen because in electronic image processing systems a television-type monitor is usually provided for display of an image and the colors red, green and blue correspond to the three color phosphors used in a TV-type monitor. The screen of a monitor is usually dark (black) and during the display of an image the phosphors are stimulated to emit red, green and blue light components which are summed in the eye of a person viewing the monitor and thereby seen as the appropriate color by the viewer. Thus, the red, green, blue (RGB) color format is an additive color format.

Electronic image processing systems are also used to process images prior to printing. Images are usually printed onto white paper and in order to achieve the correct color when the printed image is viewed inks are used to absorb light which would otherwise reflect from the white paper, thereby leaving only the unabsorbed light to be seen as the appropriate color by the viewer. In printing, cyan, magenta and yellow inks are used with cyan ink absorbing the color red, magenta ink absorbing the color green and yellow ink absorbing the color blue. The cyan, magenta, yellow (CMY) color format is a subtractive color format.

In theory any color can be represented completely in terms of RGB components or CMY components and can be converted between the RGB and CMY formats, without any loss of color or other information, by way of a matrix transform of the form:

$$(CMY) = \begin{pmatrix} a & b & c \\ d & e & f \\ g & h & i \end{pmatrix} \begin{pmatrix} R \\ G \\ B \end{pmatrix}$$

where a to i are constants. Electronic integrated circuits designed to perform such a transform at high speed are readily available.

In practice there are several limitations in the printing process which will result in true CMY data not producing a printed image containing the correct color. Firstly, the cyan, magenta and yellow inks that are available for printing are not perfect absorbers of red, green and blue light respectively. As a result darker areas of the image will not tend to be seen as black (all colors absorbed) but will instead tend to be seen as a dark purple or brown color. Secondly, in dark areas relatively large amounts of all three inks should be used to create the dark color, but laying large amounts of different colored inks onto a single area of paper often results in the ink smearing and can result in a greater amount of ink being applied to the paper than the paper has the capability to absorb. Thirdly, thick deposits of ink are hard to dry on high speed presses. Fourthly, the cost of ink is significant and using large quantities of ink to represent a single color increases the cost of printing.

One way in which the problem of printing darker areas in an image can be overcome is to use black as a fourth color in the printing process. Black text is usually required in conjunction with printed images and therefore a black ink is already available for use in the printing of the image. The image separation for black is combined with the black text on a single printing plate thereby enabling image black to be applied to the paper at the same time as the text during printing. There is, however, a problem with this approach in that simply adding black to the printed image will result in an overall darkening of the image and in order to compensate for this darkening the CMY ink separations must be suitably adjusted.

Figure 1A:
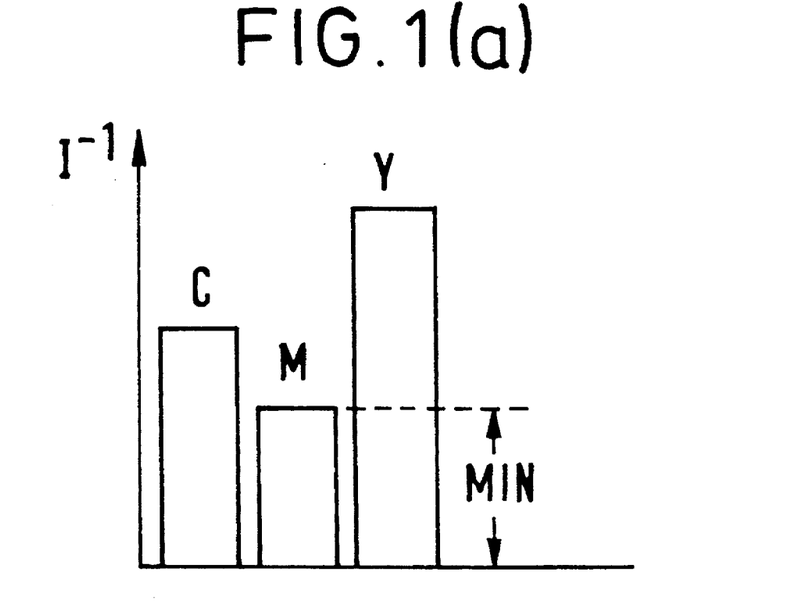
FIG. 1 shows two graphs illustrating the representation of a single color by two different color mixes, as already discussed hereinabove.
Figure 1B:
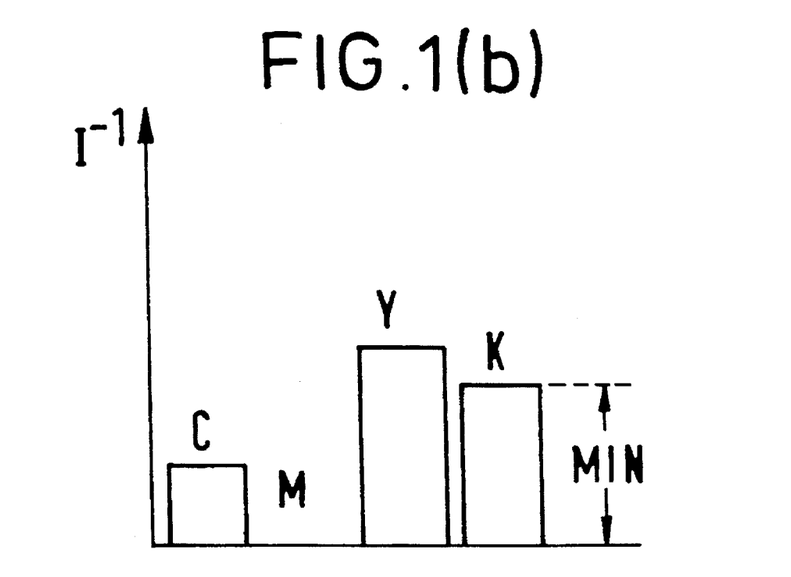

A simplistic approach to this problem would be to allocate on a picture point-by-point basis a value of black equal to the smallest of the C, M and Y values to subtract said smallest value from each of the C, M and Y values. This approach is illustrated graphically in FIGS. 1(a) and 1(b) of the accompanying drawings. The graph in FIG. 1(a) represents the C, M and Y ink values for a pixel in an image. The magenta M ink has the least value (MIN) of the three inks. The graph in FIG. 1(b) represents C,M,Y and K (black) ink values for the same pixel in the same image. In the graph of FIG. 1(b) the value MIN has been subtracted from each of the C, M and Y ink values, and consequently the magenta M ink value is zero, and a black ink K having a value equal to the value MIN has been added to the set of inks.

Whilst fine in theory, this point-by-point black (K) value allocation does not work well in practice. As mentioned hereinabove, when the three CMY color inks are combined they do not produce the color black but a black ink does of course produce the color black and therefore the absorbtion of the black ink must be different to that of the three CMY color inks in combination. This difference in absorbtion must be compensated for.

There is, however, a problem with color compensation related to the imperfect color absorbtion characteristics of the ink. Each of the three CMY color inks absorbs a respective band of frequencies of light, and these bands must overlap otherwise there would be frequencies which were not absorbed at all. In the regions where the bands overlap, both inks absorb light. Any given level of light absorbtion in a region where two inks overlap can be achieved by any one of many different mixes of the two inks or by a single amount of black ink. If the absorbtion is assumed to be caused by one of the two inks the effect of compensating by replacing that ink with black ink will be to move the color balance of the overall picture away from the color of that one ink. Similarly, the selection of one mix will result in one perceived color balance and the selection of another mix will give another perceived color. Furthermore, the color frequency at one picture point will most likely not be the same as the color frequency at another picture point and therefore the absorbtion and the mix of inks by which it is achieved will also differ between the two points. The amount of each ink in the mix at a given point depends on the absorbtion characteristics of the CMY and K inks and since these characteristics are complex it is not possible to solve the problem by way of an algorithmic approach.

An empirical solution is therefore used in which a test sheet containing a large number of different mixes or combinations of CMY and K inks is printed and each of the different colors thus created are then measured. This enables a set of transfer functions to be produced which represent the actual effect of changing the combination of inks on the color. The transfer functions provide for every color a respective CMYK ink combination which has been found to produce the color when applied to paper. Four exemplary transfer functions, one for each CMYK-color separation, are shown in FIG. 2 of the accompanying drawings. The transfer functions are defined such that for each possible input color, which may be represented by data in RGB format or any other desired format, there is one output color separation value. Thus, an input color of value x for example, will give a cyan separation value of a, a magenta separation value of b, a yellow separation value of c and a black separation value of d. The curves representing the four transfer functions in FIG. 2 are of arbitrary form drawn purely for the purpose of explanation and have no special significance. In practice the exact form of the transfer function curves will depend on the characteristics of the inks to be used in printing.

The transfer functions can be used to create a look-up table which in response to input data representing any given color will output data representing a combination of CMYK inks which will produce the color on paper. The input color data can be in CMY or RGB format, or indeed any other format which uniquely defines the input color, for example the YUV luminance and chrominance definition used in broadcast television, because a look-up table can be created with equal ease for any color data format. The look-up table performs a three dimensional color look-up operation and for this reason the table is referred to as a color cube.

In principle a color cube offers a perfect solution to the above mentioned problems because for any desired color an ink combination which results in a perfect match is provided. However, in practice the large amounts of data required to define the combinations for every color mean that a full look-up table is prohibitively expensive to produce. In a digital processing system each R, G and B or C, M, Y and K color component is usually represented by an eight bit binary number and therefore a three component color representation, e.g. RGB or CMY, is effectively defined by a twenty-four bit binary number. Such a number enables $2^{24}$, i.e. 16,777,216 or 16M, different colors to be defined. A complete look-up table would therefore contain 16M entries for each color separation or ink and since printing normally uses four CMYK inks a complete look-up table for full color printing would require 64M entries to provide for each input color four eight-bit binary numbers, one for each of the CMYK separations. Even with modern memory devices the cost of building such a large look-up table is high.

Figure 2A:
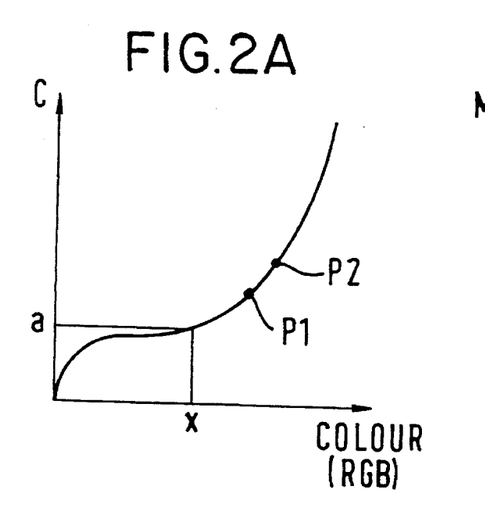
FIG. 2 shows four graphs representing exemplary transfer functions from a color to a color separation, as already discussed herein.
Figure 2B:
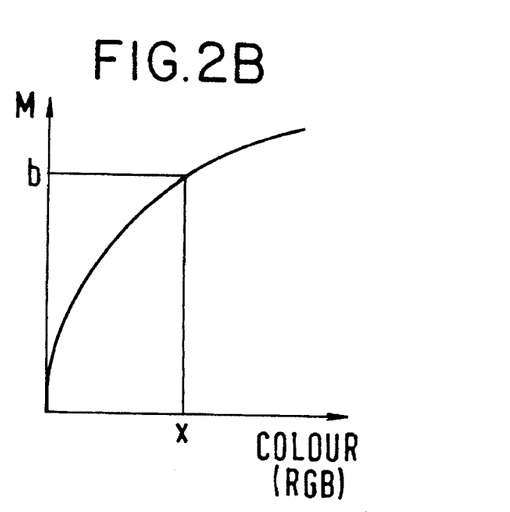
Figure 2C:
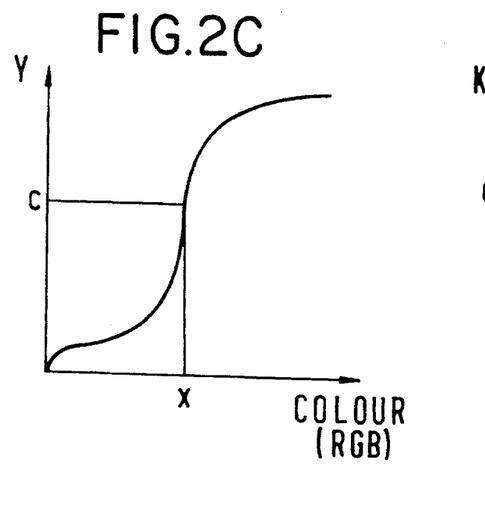
Figure 2D:
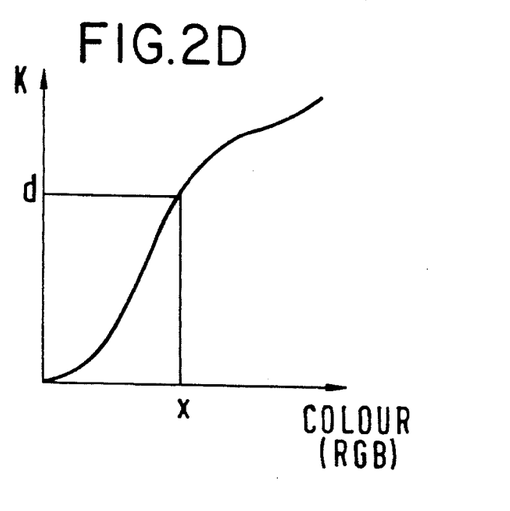

Looking at the transfer functions in FIG. 2 of the accompanying drawings, it will be noted that between relatively close points, for example points P1 and P2 in the cyan transfer function of FIG. 2(a), the complex transfer curves change in a continuous smooth and predictable manner. It is possible to take advantage of this fact in order to reduce the size of the look-up table to more cost effective proportions.

Figure 3:
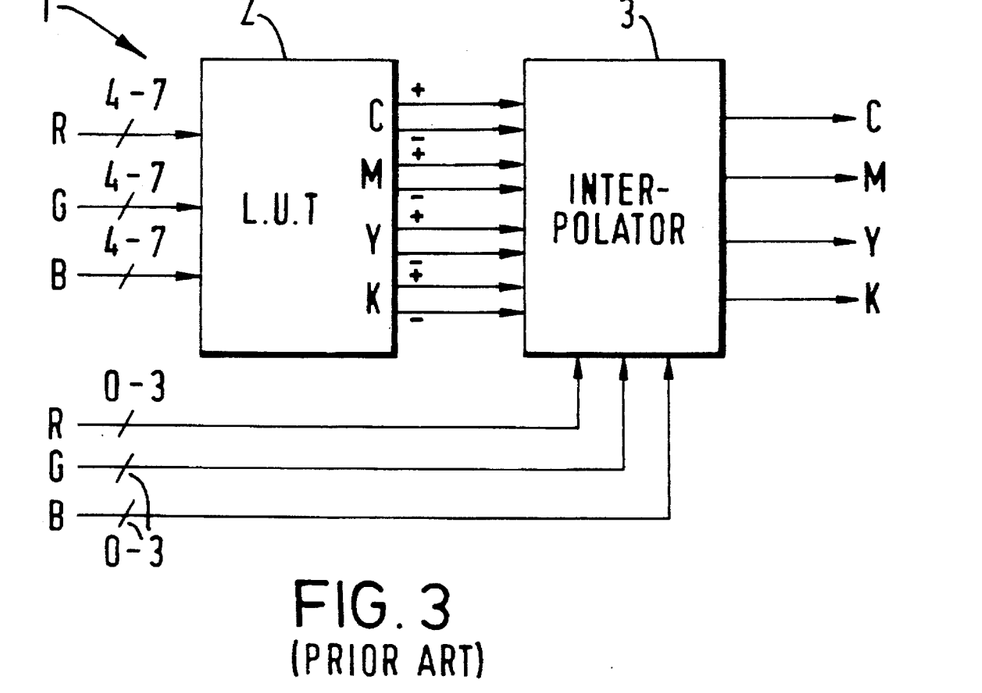
FIG. 3 is a schematic diagram of a known processing system as described hereinabove.

Turning to FIG. 3 of the accompanying drawings there is shown a known system 1 comprising a look-up table 2 and an interpolator 3. As shown in FIG. 3 the desired color is defined in terms of RGB color components with each component being represented by an eight-bit binary number. The four most significant bits (bits 4–7) of each of the RGB color components are input to the look-up table 2. Since only the four most significant bits of the RGB color component data is used the color definition is relatively coarse. The look-up table is therefore arranged to output two values for each of the CMYK color components, the two values of each component defining a range of color within which the desired color is located. The two values for each of the CMYK color components are represented by the symbols $C^+$ and $C^-$, $M^+$ and $M^-$, $Y^+$ and $Y^-$ and $K^+$ and $K^-$ in FIG. 3 and between them define the corners of a cube in CMYK color space.

Figure 4:
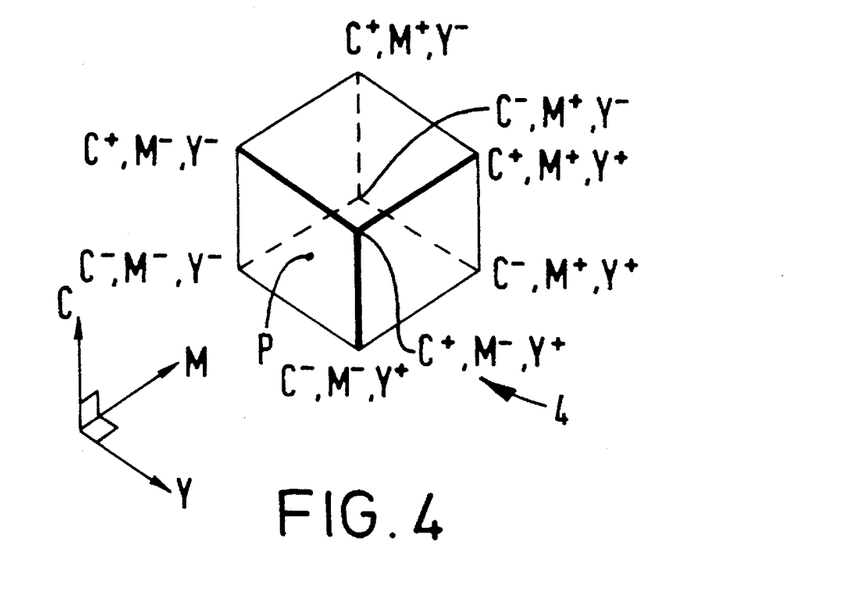
FIG. 4 shows a color cube in CMY color space, as previously discussed herein.

FIG. 4 of the accompanying drawings shows a cube 4 in CMY color space having corners at coordinate positions defined by the values $C^+$ and $C^-$, $M^+$ and $M^-$, $Y^+$ and $Y^-$. The black K axis is not shown in FIG. 4 but it should be noted that the values $K^+$ and $K^-$ are used in a similar manner as the other color component values to delimit the volume in color space. The actual color defined by the input RGB color data is at a point P somewhere within the cube 4 and the exact coordinates of the point can be determined by interpolating between the values $C^+$ and $C^-$, $M^+$ and $M^-$, $Y^+$ and $Y^-$ and $K^+$ and $K^-$, the values being input to the interpolator 3. The four least significant bits (bits 0–3) of the RGB color component data are also input to the interpolator 3 and are used therein to calculate interpolation weighting coefficients which are applied to the values $C^+$, $C^-$ and $M^+$, $M^-$ and $Y^+$, $Y^-$, and $K^+$, $K^-$ to find the exact values of C, M, Y and K that represent the color at the point P. An image reproducing method and apparatus which uses this approach is described in GB-A-1369702.

There is, however, a problem with this approach which shows up particularly in the black (K) separation and is caused by errors which are inherent in the interpolation. Consider, by way of example, a look-up table arranged to generate values of K using an approach similar to that described hereinabove with reference to FIG. 1. That is to say, the look-up table is arranged such that the output value of K corresponds to the lowest of the values of the C, M and Y components. Assume that the data representing each color component comprises eight bits (giving a total of 256 different values for each component) and that a four-bit look-up table is used. For a point P whose true position is C=M=Y=40 the look-up table will provide for each color component a value above (i.e. 48) and a value below (i.e. 32) the true position. Thus, the look-up table will define a cube in color space having a diagonal axis between the points (32, 32, 32) and (48, 48, 48). At each corner of the cube the value of K is the smallest of the CMY coordinate values, as is shown in the following table:

| C | M | Y | K |
| --- | --- | --- | --- |
| 32 | 32 | 32 | 32 |
| 48 | 32 | 32 | 32 |
| 32 | 48 | 32 | 32 |
| 48 | 48 | 32 | 32 |
| 32 | 32 | 48 | 32 |
| 48 | 32 | 48 | 32 |
| 32 | 48 | 48 | 32 |
| 48 | 48 | 48 | 48 |

It can be seen from the table that with the exception of the corner of the cube at coordinates (48, 48, 48) the value of K at each point identified by the interpolator is 32. At the point (48, 48, 48) the value of K is 48. An interpolation algorithm for locating the value of K at the centre of the cube, i.e. at the point P, will give equal weighting to the value of K at each of the eight corners of the cube. This will give a value of K=(32×7+ 48)/8= 34. The actual value of K at the point P should be 40 and therefore there is an error of 6. In a total of 256 possible levels an error of six levels corresponds to approximately 2.3%, which is not trivial.

Figure 5:
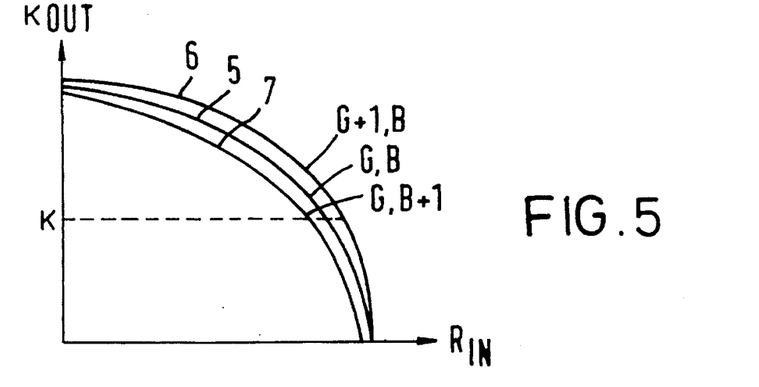
FIG. 5 shows a further transfer function which is discussed hereinabove.

The same problem manifests itself in another way as will now be explained with reference to FIG. 5 of the accompanying drawings. As mentioned hereinabove any given color in a three color system can be achieved by any one of many different mixes of two or more colors in a four color system. The effect that this has on the relationship between any one input color, say red, and any one output color, say black, is shown in the exemplary transfer function between red (Rin) and black (Kout) in FIG. 5 of the accompanying drawings. Line 5 shows for fixed values of green G and blue B the transfer function between Rin and Kout. If the fixed value of green is increased to G+1 then the transfer function will move to a new position depicted by the line 6 in FIG. 5 and, similarly, if instead the fixed value of blue is increased to B+1 the transfer function will occupy the position of the line 7. In the interpolation to find the value K the interpolator is required in effect to interpolate along multiple transfer function lines. This means that several simultaneous equations must be solved in order to arrive at the value K but there are too many unknown variables for this to be achieved in practice. The interpolator 3 is therefore arranged to provide values for C, M, Y and K based on several assumptions about the colors. It will be appreciated that this does not always give an entirely satisfactory solution.

One solution to the problem of interpolation errors is proposed in GB-A-2053619. This solution is complex and relies on an approach based on overcoming the errors rather than solving the underlying problems which cause the errors to be generated in the first place.

According to one aspect of the invention there is provided an image processing system for processing digital image data in a first color format comprising a first set of at least three color axes, the data defining a large number of pixels which together represent an image with the data for each pixel comprising a most significant part and a least significant part in each color axis, the system comprising a color converter for converting the data to separation data defining at least one selected color separation in the image, the converter comprising: transforming means for transforming said image data from said first color format to a second color format comprising a second set of axes different to the first set, said second set of axes including an axis which corresponds substantially with the selected color separation; calculating means for calculating for each pixel from the most significant part of the data for each axis in said second format a respective approximate separation value; and correcting means responsive to the least significant part of the data for each axis in the second format for correcting the approximate separation value to obtain a correct separation value, the converter thereby providing on a pixel-by-pixel basis data defining the selected color separation.

According to another aspect of the invention there is provided a method of processing image data in a first color format to produce data representing at least one image color separation, the first color format comprising a first set at least three color dimensions and the image data defining a multiplicity of pixels which together form an image, with the data for each pixel comprising a most significant part and a least significant part, the method comprising: transforming said image data from said first color format to a second color format comprising a second set of color dimensions including a color dimension which corresponds substantially with said color separation; calculating for each pixel from the most significant part of the data for each color dimension in said second format a respective approximate separation value; and correcting the approximate separation value on the basis of the least significant part of the data for each dimension in the second format, thereby providing a correct separation value for the color separation on a pixel-by-pixel basis.

According to a further aspect of the invention there is provided an apparatus for producing output digital color separation signals from input digital color separation signals, the apparatus comprising rotator means to which said input signals are supplied and a look-up table and interpolator means for deriving for each picture element of said input signal a picture element of said output signal, said rotator being adapted to refer said output signal picture elements to image separation components different from the separation components of the input signal in a manner to ensure that said output signal picture element comprises in a high proportion a chosen one of said output signal separation components.

The above and further features of the invention are set forth in the appended claims and together with advantages thereof will become clearer from consideration of the following detailed description of exemplary embodiments of the invention given with reference to the accompanying drawings.

DETAILED DESCRIPTION

Figure 6:
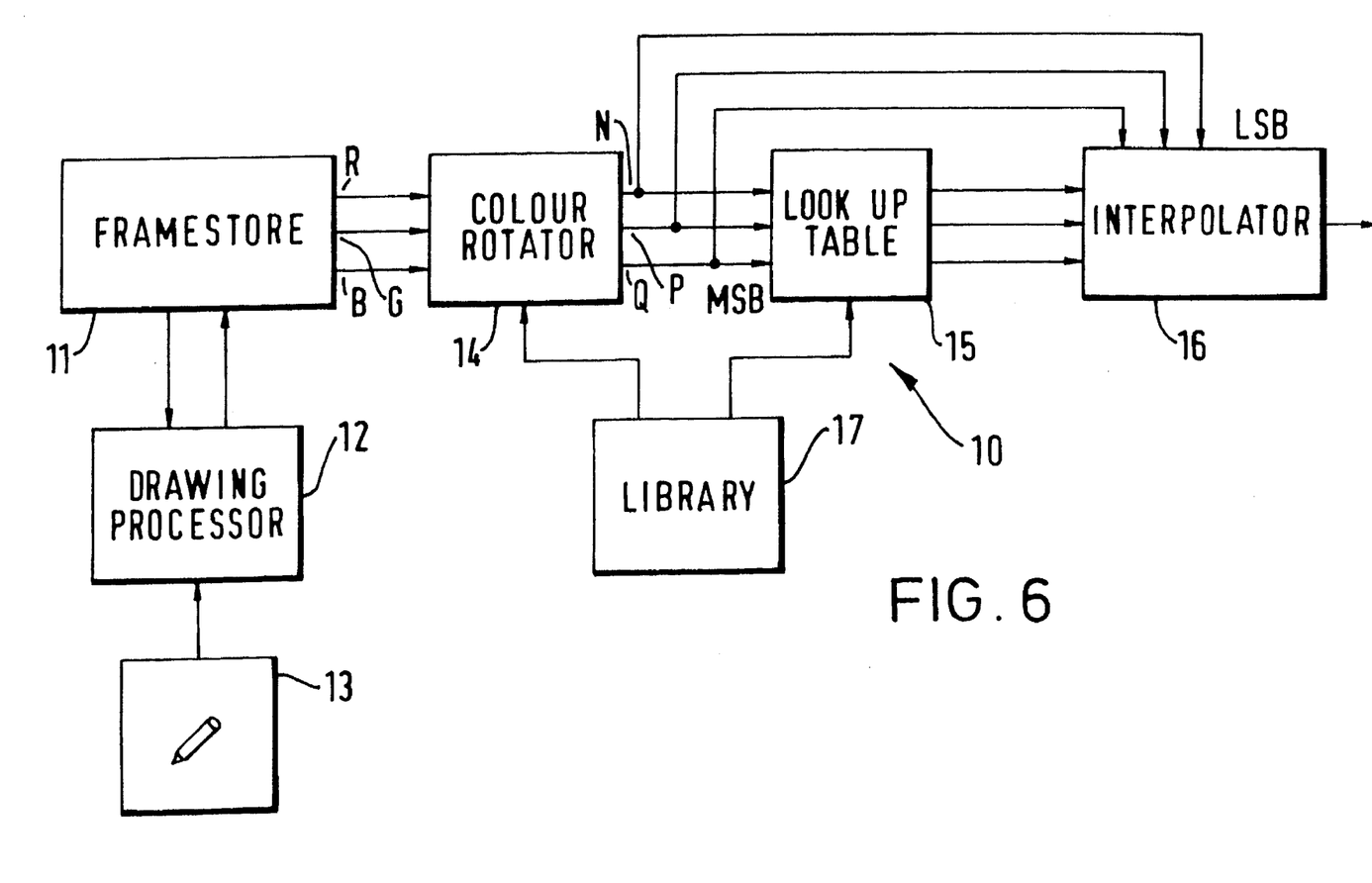
FIG. 6 is a schematic diagram of a system embodying the invention.

Turning now to FIG. 6 of the accompanying drawings there is shown an image processing system 10 which embodies the invention. The system 10 comprises a framestore 11 for storing digital data representing an image in one color format, for example red, green, blue (RGB) separation data, and a drawing processor 12 controlled by way of a user operable stylus and touch tablet device 13. The digital data stored in the framestore 11 represents a large number of picture elements (pixels) which together form the image. Each pixel is represented by three bytes (8-bits) of data, one for each of the red, green and blue (RGB) color components. Of course, the data need not represent RGB components and may instead represent luminance (Y) and chrominance (UV) components or cyan, magenta, yellow (CMY) components for example. The framestore 11, drawing process 12 and touch tablet 13 together form a source of image data and may be replaced by any other suitable source of image data such as an off line bulk data store, a television camera or an image scanner for example. RGB image data from the store 11 is input to a color rotator 14 which converts the RGB data into image data in another color format of arbitrary colors NPQ with each color component N, P and Q of each pixel being represented by an 8-bit byte.

Any color can be represented by a line in color space. Thus, for example, the purple color on the wrappers of some chocolate bars is printed using a single ink and lies along one line positioned in color space, the intensity of the color increasing in one direction along the line and decreasing in the other direction along the line. Similarly, the green color found on some packets of frozen food is produced with a single ink and can be represented by another line in color space. The NPQ color data comprises color data representing at least three colors, chosen so that the axis of at least one of the colors corresponds to a line in color space representing the color of an ink that is to be used in printing the image.

The color rotator 14 effects a matrix transform of the form:

$$(NPQ) = \begin{pmatrix} a & b & c \\ d & e & f \\ g & h & i \end{pmatrix} \begin{pmatrix} R \\ G \\ B \end{pmatrix}$$

A matrix circuit suitable for performing this transform is described in commonly owned European patent application published as EP-A-245943 and U.S. Pat. No. 4,829,455, the teachings of which are incorporated herein by reference.

Data output from the color rotator is applied to a look-up table 15 and an interpolator 16. As in the prior art system 1 shown in FIG. 3 of the accompanying drawings, the four most significant bits (bits 4-7) of the NPQ date are input to the look-up table 15 and the four least significant bits (bits 0-3) are input to the interpolator 16. The look-up table 15 provides data defining a volume in color space in terms of N, P and Q coordinates in which the required color is located. The color coordinate data from the look-up table 15 is interpolated by the interpolator 16, under the control of the least significant bits of the NPQ data which is used to define interpolation coefficients, to identify the actual position of the required color.

The RGB data from the framestore 11 is rotated into the NPQ format once for each of the NPQ colors such that on each rotation one of the NPQ axes is aligned with the line in color space corresponding to the color of an ink to be used in printing the image. The system 10 comprises a library 17 of coefficients sets which supplies coefficient data to the color rotator 14 and the look-up table 15. The coefficient data controls the manner in which the color rotator rotates the RGB format data into NPQ format data. For each rotation from RGB to an NPQ color separation different coefficient data will usually be loaded from the library 17 and the rotations will usually be different.

Figures 7, 8:
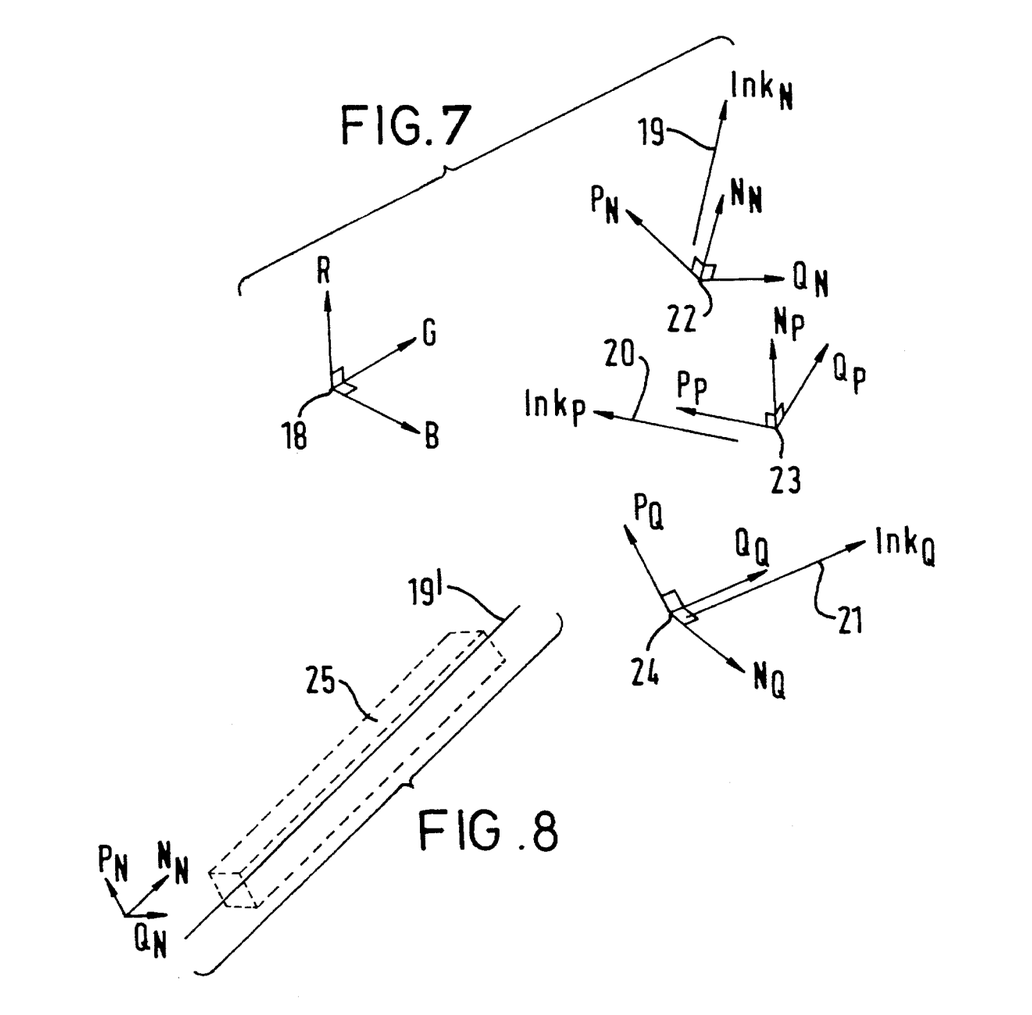
FIG. 7 shows sets of axes representing the manner in which color data may be rotated by the system of FIG. 6.
FIG. 8 shows the effect on a color cube of rotating color data to align with an ink axis.

The manner in which the color data is rotated in the rotator 14 is depicted in FIG. 7 of the accompanying drawings. The coordinate system for the RGB data is represented by a set of RGB axes having an origin 18 positioned in color space at R=G=B=0, i.e. black. For the purpose of illustration it will be assumed that three inks, $ink_N$, $ink_P$ and $ink_Q$ are to be used in the printing of the image. The three inks are represented by three lines 19, 20, 21 respectively in color space. For a given pixel the RGB data is rotated three times, once for each of the three inks so that following each rotation one of the NPQ axes is aligned with one of the lines 19, 20, 21. Thus, for $ink_N$ the RGB data is rotated into NPQ data having a coordinate system represented by a set 22 of axes $N_N$, $P_N$, $Q_N$ with the axis $N_N$ aligned with the line 19 corresponding to the color of the $ink_N$. Similarly, for $ink_P$ the RGB coordinate system is rotated into NPQ coordinate system represented by a set 23 of axes $N_P$, $P_P$, $Q_P$ with the axis $P_P$ aligned with the line 20 corresponding to the color of $ink_P$ and for $ink_Q$ the RGB axes 18 are rotated onto a set 24 of axes $N_Q$, $P_Q$, $Q_Q$ such that $Q_Q$ is aligned with the line 21, corresponding to the color of $ink_Q$.

The effect of rotating the color data before it is applied to the look-up table is to change the form of the data from three primary terms R, G and B, each of equal weight, to one primary term, say N, and two correction terms, say P and Q. When the NPQ data is applied to the look-up table the table outputs data which represents a volume in color space of a form similar to that depicted in FIG. 8 of the accompanying drawings.

FIG. 8 shows a portion 19' of the line representing the color of $ink_N$. The look-up table outputs a set of coordinates which together define a volume 25 in color space. The volume 25 has a major axis which lies along the $ink_N$ line 19' and two minor axes parallel to the axes $P_N$ and $Q_N$. The majority of the data is concerned with the color N and interpolation of the NPQ data will give a value of $ink_N$ to a high degree of accuracy. Errors in N are thus minimal and since P and Q are effectively correction terms any errors introduced thereby have a negligible effect on the accuracy to which the value of $ink_N$ is defined. Put another way, the purpose of rotation is to bring the three lines 5, 6, 7 of FIG. 5 so close together that they effectively are one line thereby facilitating accurate interpolation between two values provided by the look-up table.

The above described approach provides a highly accurate transformation from one color format to another. As with all digital systems, the digital representation of a color in one color coordinate system will not transform exactly into a different representation in another color coordinate system. After transformation the newly determined color values are rounded up or down to the nearest available value in the new coordinate system. The thus transformed data may be stored for subsequent use or it may be output directly to a printer for printing of the image.

The invention may also be applied to a chroma keying device for use in keying foreground and background television images together in a single image.

Figure 9:
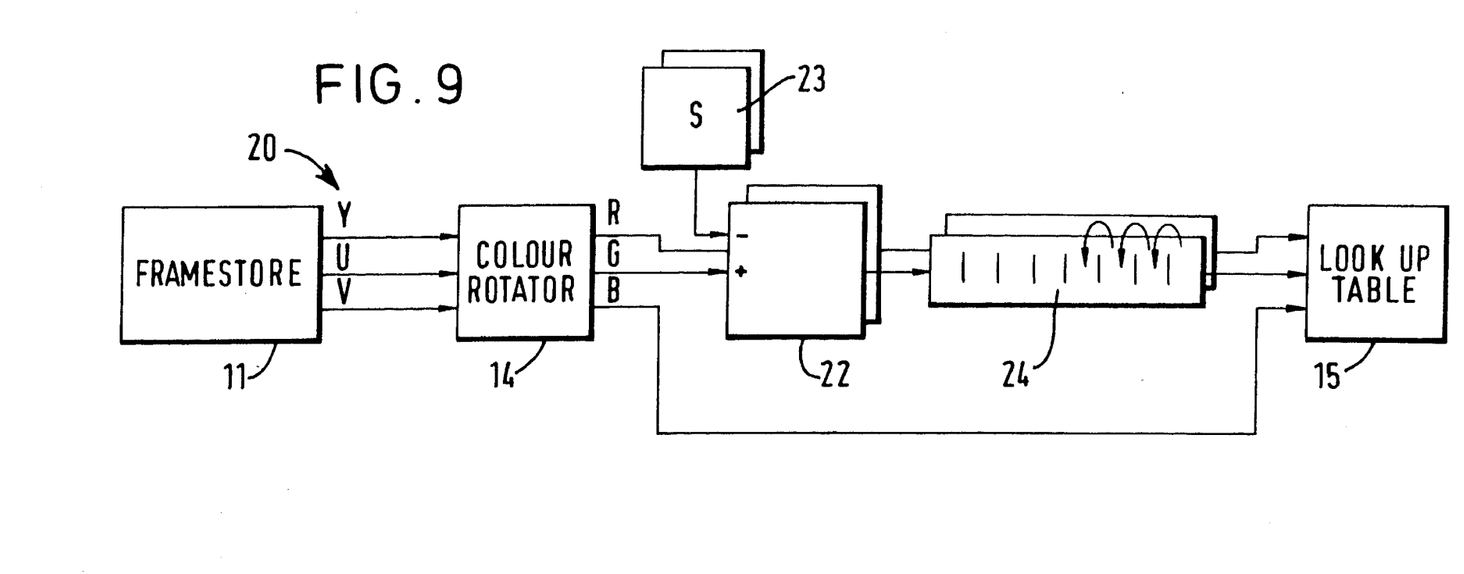
FIG. 9 is a schematic diagram of another system embodying the invention, the system being suitable for use in chroma keying.

A chroma keying system 20 embodying the invention is shown in FIG. 9 of the accompanying drawings. In the system 20 parts which perform the same function as corresponding parts in the system 10 are designated with the same reference numeral. The system 20 comprises a framestore 11 or other source of picture data in the form of pixels. As shown in FIG. 9, the framestore 11 or other source provides pixels in YUV (luminance and chrominance) format to a color rotator 14 where it is converted into RGB data. In a chroma keying system a chroma key signal is generated by detecting the presence of a particular color (usually a strongly saturated blue) in an image. The key is then used to combine the image, usually as a foreground image, with another image which usually serves as a background. A chroma key signal is at a maximum for a narrow range of color values around a selected key color value. The key signal value drops smoothly and quickly to zero as the distance of the color from the color value increases. The smooth change enables intermediate values to be generated so that pixels on the boundary between a keyed area and an unkeyed area comprise a contribution from both the foreground and the background image. This enables a background and foreground image to blend smoothly into one another.

The colors red and blue are commonly used in chroma keying because most electronic image systems store color in RGB format. However, it is sometimes useful to use other colors as the key color. For example it is useful to be able to select a key color from a color formed in an image, such as the color of the sky. Unlike a key color which is provided by a backdrop set up intentionally in a studio and arbitrarily selected key color will not necessarily correspond to one of the RGB primary color axes and will not necessarily be a strongly saturated color. Such an arbitrarily selected key color is therefore similar in nature to the arbitrary color of inks discussed with respect to the above embodiment.

In principle a color cube look-up table can be used to generate a key signal in exactly the same way as the table 15 is used in the system 10 to generate an ink signal. However, the reduced resolution of the look-up table (only the most significant bits are used) provides a coarse color definition which effectively results in chroma key data being lost. For example, a blue chroma key in RGB format will be represented by blue intensity values across virtually the whole range of available blue values and by red and green values across a very narrow band of available red and green values. In an 8-bit system the bands of red and of green values might occupy only sixteen of the available 256 values. If the look-up table only takes the four most significant bits of the red and of the green data then all of the key values in red and green would be represented by only two or three look-up table entries. Interpolating between values thus obtained from the look-up table would give an entirely arbitrary and meaningless result.

In order to overcome this problem the chroma keying system 20 of FIG. 9 comprises means for offsetting and multiplying color values before they are input to the look-up table 15, thereby providing a useful range of color values from which the keying signal can be determined. Thus, the system 20 comprises two subtractors 22 in parallel for subtracting a respective offset value S held in a respective register 23 from the red and green components of the RGB data output from the color rotator 14. The subtractors 22 output a value to a respective multiplier or shift register 24 which multiplies the output value by a predetermined constant. The outputs from the shift registers 24 are applied as the red R and green G components of RGB data to the look-up table 15.

It will be appreciated that the system 20 of FIG. 9 includes a library similar to that in the system 10 in FIG. 6 and that only the four most significant bits of the RGB data output from the color rotator 14 need be applied to the subtractor 22 and look-up table 15. The system 20 also includes an interpolator which receives data from the look-up table 15 and the four least significant bits of the offset RGB data from the color rotator 14. These features and details have been omitted from FIG. 9 for the same of clarity.

Figure 10:
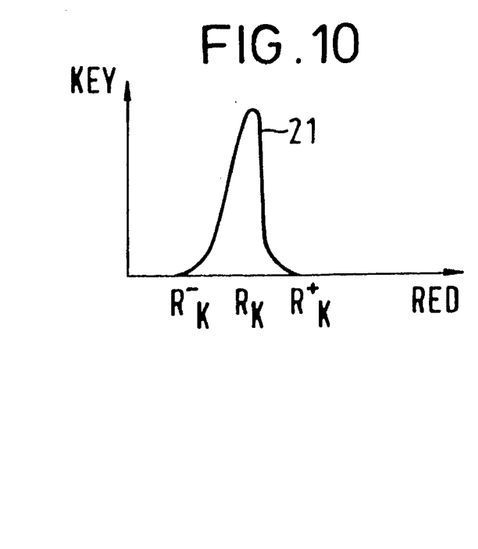
FIG. 10 is a graph showing contributions to a blue key by red color components.
Figure 11:
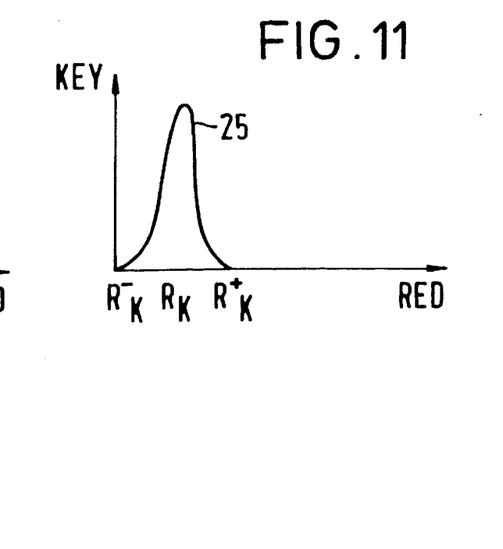
FIG. 11 is a graph showing how a part of the system of FIG. 9 affects the data represented by the graph in FIG. 10.
Figure 12:
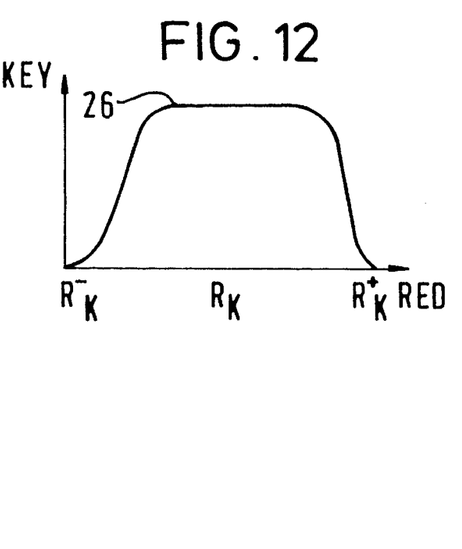
FIG. 12 is a graph showing how another part of the system of FIG. 9 affects the data represented by the graph in FIG. 11.

The effect of the subtractor 22 and shift register 24 on the color from the color rotator 14 is illustrated for the red component in FIGS. 10, 11 and 12 of the accompanying drawings. As shown in FIG. 10 the chroma key signal defined by the red data output from the color rotator is at a maximum for a selected key color value $R_K$ and rapidly falls to zero for color values $R^-_K$ and $R^+_K$. By applying the data to the subtractor 22 the graph 21 is caused to shift toward the origin and if the offset value S is chosen to be equal to $R^-_K$ then the graph will correspond to the plot 25 shown in FIG. 11 of the accompanying drawings. The multiplier or shift register 24 serves to stretch or expand the plot to that represented by the line 26 in FIG. 12 of the accompanying drawings wherein $R^-_K$ is at the original and $R^+_K$ is near to, but less than, the maximum value definable by 8-bit data. Similar considerations of course apply to the processing of the green color component.

By way of example suppose that the range of values of the red component R for which the key is not zero, i.e. the active range of values, is from the value 20 to the value 40 inclusive. That is to say for the values 20 and 40 very small key values are generated and for values below 20 and above 40 key values of zero are generated. In the active range between the values of 20 and 40, the key signal increases so that for a few points each side of the central value, i.e. the value 30 the key is at its maximum value. The register 23 is loaded with a value of S equal to the value 19 thereby causing the value of 19 to be subtracted from all input values of R. The subtractor 22 is arranged not to output values less than zero. In this way the active range is shifted down to the range of values between the value 1 and the value 21 inclusive. The shift register 24 is arranged to shift the data three places to the left, which is equivalent to multiplying the data by a factor of 8. Thus, the shift register 24 alters the active range to cover all values from the value 8 to the value 168 (i.e. from 1×8 to 21×8) inclusive. A range of values from 8 to 168 is suitable for use in the look-up table 15. A similar operation is of course performed for the green component.

It will be appreciated that the effect of the shift register 24 is to stretch or multiply the active range of values. Those with the appropriate skills will realise that a multiplier may be used in place of the shift register and that since the precise value of multiplication is not relevant the use of a multiplier in the system would in fact amount to unnecessary expense.

In a chroma key system, unlike a print separation generation system such as the above discussed system 10, look-up table values can be generated on the basis of a predetermined algorithm. In some video processing systems, for example the system that we manufacture and sell under the trade mark "HARRY", a facility is provided by which a user can select a central key color. The selection of a central color causes a cuboid to be defined around the color and the system is arranged such that the user can modify the cuboid by changing lengths along each of its three axes independently.

The foregoing example assumed that the chroma key is based on the blue content of a picture. Blue is the usual choice of color but other colors, for example yellow, may instead be used. With a yellow key in an RGB system any modification of the axes will result in an alteration in both red and green dimensions because the color yellow contains contributions from the colors red and green. In this situation the advantage of shifting and multiplying the color data prior to applying it to the look-up table is lost. However, the color rotator can be used to regain the advantage. Where, say, yellow is used to generate a key signal the color rotator 14 would be arranged to rotate the luminance and chrominance data YUV into a yellow component and two other suitable color components (i.e. cyan and magenta). With the color axes thus re-aligned to cyan, magenta and yellow the above discussed advantages in respect of a blue key apply equally to a yellow key.

Having thus described the present invention by reference to preferred embodiments it is to be well understood that the embodiment in question are exemplary only and that modifications and variations such as will occur to those possessed of appropriate knowledge and skills may be made without departure from the spirit and scope of the invention as set forth in the appended claims and equivalents thereof.

I claim:

1. A digital image processing system for converting image data representing a color value in a first plural-color format into data representing a separation value of one or more respective color separations, the data defining a multiplicity of pixels which together form an image, the system comprising:

first transforming means for transforming pixel-by-pixel said image data in said first plural-color format to produce data in a second plural-color format different than said first plural-color format and selected such that one or more of the colors of the second plural-color format respectively corresponds substantially with one or more colors of the one or more color separations; and second transforming means for determining for each pixel from most significant parts of the data in said second plural-color format range data defining a range of values, and for calculating from the range data using least significant parts of the data in the second plural-color format, separation data, the thereby producing on a pixel-by-pixel basis a separation value for the one or more color separations.

2. An image processing system as claimed in claim 1, further comprising a data library for supplying transformation data to said first transforming means and calculation data to said second transforming means, said data library containing transformation and calculation data for a multiplicity of different conversions.

3. An image processing system as claimed in claim 1, wherein the data in said first plural-color format comprises plural-color component values, said first transforming means comprises a transformation matrix, and said data in said second plural-color format is produced by multiplication of said first plural-color component values by respective constant values in said transformation matrix.

4. An image processing system as claimed in claim 1, wherein the second transforming means comprises a look-up table containing data arranged to identify for each value of data in said second plural-color format which can be input thereto a range of values including the output separation value.

5. An image processing system as claimed in claim 1, wherein the second transforming means is arranged to produce the range data as two values with one value being greater than and the other value being less than the output separation value, and the second transforming means comprises an interpolator arranged to interpolate between the two values.

6. An image processing system as claimed in claim 1, wherein said colors in said first plural-color format are orthogonal.

7. An image processing system as claimed in claim 1, wherein said first plural-color format comprises three additive color components.

8. An image processing system as claimed in claim 1, wherein said colors in said second plural-color format are orthogonal.

9. An image processing system as claimed in claim 1, wherein said second plural-color format comprises at least three subtractive color components.

10. An image processing system as claimed in claim 9, wherein said second plural-color format further comprises a black component.

11. An image processing system as claimed in claim 1, wherein the color separations correspond to the colors of inks to be used in printing the image.

12. An image processing system as claimed in claim 11, wherein the first and second transforming means are arranged to create respective separation data for each color of ink to be used in printing the image.

13. An image processing system as claimed in claim 1, wherein one of the color separations corresponds to the color of a chroma key to be used in combining a portion of another image with the image.

14. An image processing system as claimed in claim 13, wherein the image and the other image are corresponding frames in respective video clips.

15. An image processing system as claimed in claim 1, further comprising means for offsetting data in said second plural-color format and for multiplying said offset data such that said data occupies a maximized range.

16. An image processing system as claimed in claim 15, wherein said means comprises a subtractor for subtracting an offset value held in a register from said data and a shift register for multiplying said offset data by a predetermined amount.

17. A method of converting image data representing a color value in a first plural-color format into data representing a separation value of one or more respective color separations, the data defining a multiplicity of pixels which together form a color image, the method comprising:

transforming pixel-by-pixel said image data in said first plural-color format to produce data in a second plural-color format different than said first plural-color format and selected such that one or more of the colors of the second plural-color format respectively corresponds substantially with one or more colors of the one or more color separations;

determining for each pixel from most significant parts of the data in said second plural-color format range data defining a range of values; and calculating from the range data using least significant parts of the data in the second plural-color format separation data, thereby producing a separation value for the one or more color separations on a pixel-by-pixel basis.

18. A method as claimed in claim 17, wherein said colors in said first plural-color format are orthogonal.

19. A method as claimed in claim 17, wherein said first plural-color format comprises three additive color components.

20. A method as claimed in claim 17, wherein said colors in said second plural-color format are orthogonal.

21. A method as claimed in claim 17, wherein said second plural-color format comprises at least three subtractive color components.

22. A method as claimed in claim 21, wherein said second plural-color format further comprises a black component.

23. A method as claimed in claim 17, wherein the color separations correspond to the colors of inks, to be used in printing the image.

24. A method ad claimed in claim 17, wherein one of the color separations corresponds to the color of a chroma key to be used in combining a portion of another image with the image.

25. A method as claimed in claim 17, wherein the separation value is calculated from the range data by interpolation.

26. A digital image processing system for processing data comprising:

a multiplicity of pixels forming a color image to provide desired color separation data therefrom, said image pixels being defined in a first format of one or more color axes along which respective color component values of said pixels are represented and said color separation data being defined in a second format of at least three color axes along which respective color component separation values are represented; and first and second transforming means of which the first transforming means is supplied with said image data in said first format and effects conversion thereof to the second format, one of said color axes in the second format being disposed so that values therealong approximate to pixel component values of the desired color separation, and the second transforming means is supplied with color component data from the first transforming means in said second format and employs most significant parts thereof to identify to a first approximation the location in the second format of color axes of the desired separation component value and further employs least significant parts of the component values supplied thereto in the second format to calculate frown the approximate location determined by said most significant parts a more accurate location of the desired separation component value.

27. A system as claimed in claim 26, wherein the first transforming means produces data in said second format by multiplication of the component values input thereto by a matrix of respective constant values.

* * * * *

UNITED STATES PATENT AND TRADEMARK OFFICE
CERTIFICATE OF CORRECTION

PATENT NO. : 5,568,596

DATED : October 22, 1996

INVENTOR(S) : Robin A. CAWLEY

It is certified that error appears in the above-identified patent and that said Letter Patent is hereby corrected as shown below:

Title page, left-hand column, section [30] "Foreign Application Priority Data", please amend "Feb. 25, 1994" to --Feb. 25, 1993--

Signed and Sealed this

Twenty-fourth Day of June, 1997

Attest:

BRUCE LEHMAN

Attesting Officer

Commissioner of Patents and Trademarks